(12) United States Patent
Sorenson et al.

(10) Patent No.: US 12,339,120 B2
(45) Date of Patent: Jun. 24, 2025

(54) MODULAR INERTIAL MEASUREMENT UNIT AND ELEMENTS FOR MAKING SAME

(71) Applicant: HRL Laboratories, LLC, Malibu, CA (US)

(72) Inventors: Logan Sorenson, Malibu, CA (US);
Raviv Perahia, Malibu, CA (US);
Matthew Pelliccione, Malibu, CA (US);
Hung Nguyen, Malibu, CA (US);
David Chang, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 240 days.

(21) Appl. No.: 18/123,984

(22) Filed: Mar. 21, 2023

(65) Prior Publication Data
US 2024/0318961 A1 Sep. 26, 2024

(51) Int. Cl.
*G01C 21/16* (2006.01)
(52) U.S. Cl.
CPC ..................................... *G01C 21/16* (2013.01)
(58) Field of Classification Search
None
See application file for complete search history.

(56) References Cited

U.S. PATENT DOCUMENTS

| | | | |
|---|---|---|---|
| 4,811,948 A * | 3/1989 | Gutierrez | A63F 9/12 273/156 |
| 8,100,010 B2 | 1/2012 | Fly et al. | |
| 9,696,340 B2 | 7/2017 | Trusov et al. | |
| 2013/0111993 A1 | 5/2013 | Wang | |
| 2021/0370193 A1* | 12/2021 | Chemshit | F16B 7/18 |

FOREIGN PATENT DOCUMENTS

| | | | |
|---|---|---|---|
| DE | 20208388 U1 * | 8/2002 | |
| KR | 20-2018-0000163 U | 1/2018 | |
| KR | 10-2020-0120146 A | 10/2020 | |
| KR | 10-2023-0015016 A | 1/2023 | |
| WO | WO-9738229 A1 * | 10/1997 | E04B 1/1912 |
| WO | 2009-129066 A2 | 10/2009 | |

OTHER PUBLICATIONS

PCT International Search Report and Written Opinion from PCT/US2023/019801 dated Dec. 6, 2023.

* cited by examiner

*Primary Examiner* — Lisa M Caputo
*Assistant Examiner* — Cynthia L Davis
(74) *Attorney, Agent, or Firm* — Ladas & Parry, LLP (57) ABSTRACT

A corner bracket comprising a volume of matter having n pairs of parallel faces, where n is an integer larger than 2; each face of each pair of parallel faces comprising an opening; the openings in the faces of each pair of parallel faces being joined by a cylindrical recess having a longitudinal axis perpendicular to the faces joined by the cylindrical recess; the longitudinal axis of the cylindrical recesses being arranged such that the cylindrical recesses do not intersect each other. The number n can be 3 and the volume of matter can be a cube.

17 Claims, 8 Drawing Sheets

MODULAR INERTIAL MEASUREMENT UNIT AND ELEMENTS FOR MAKING SAME

TECHNICAL FIELD

This presentation relates to electronic assemblies; in particular assemblies such as Inertial Measurement Units, that comprise a plurality of substrates or boards bearing each a sensor and attached together at an angle. This presentation also relates to modular elements allowing to build such electronic assemblies.

BACKGROUND

Inertial measurement units (IMU) are electronic devices that can measure and report the forces applied to a body, the angular rate of the body, and sometimes the orientation of the body, using a combination of accelerometers, gyroscopes, and eventually magnetometers. IMUs can be used to help maneuver vehicles, manually or automatically. Prior art in the fields of Inertial Measurement Units and sensor clusters include the following:

U.S. Pat. No. 9,696,340, B2: Multi-axis chip-scale MEMS inertial measurement unit (IMU) based on frequency modulation discloses a single chip implementation of an IMU, where multiple sensor designs are needed to fully sense all 6 degrees of freedom (DOF) in 3D space (X, Y, Z accelerations and rotations about the X, Y, and Z axes). A downside to this approach is that performance is often compromised due to space constraints on the single chip, as well as sensing in plane rotations (rotations about the X and Y axes of the chip, where Z is the direction out of the plane of the chip).

An IMU manufactured by Honeywell under the commercial name HG4930 IMU comprises a single packaged device containing 3 relatively high performance single axis gyroscopes: 2 in plane gyroscopes and 1 out of plane gyroscope. Although this IMU is constructed from individual relatively high performance sensors, it still requires multiple sensor designs to sense in plane and out of plane DOFs.

U.S. Pat. No. 8,100,010 discloses methods and systems for forming an electronic assembly having inertial sensors mounted thereto, and details the importance of installing sensors in proper arrangement along specific axes, where there are 2 sets of 3 orthogonal sensors (1 set of acceleration sensors and 1 set of gyroscope sensors). This reference employs optimized single axis sensor designs and a L-shaped bracket to obtain the 3 necessary orientations. Flexible circuits are used to bridge from the base PCB to the sides of the L-shaped brackets. Their design is not modular in that none of the given sensors can be swapped in and out by replacing a panel in the IMU.

Building an inertial sensor cluster that optimizes Cost, Size, Weight and Power is of high interest, for example to industries looking for advances in areas of autonomy and positioning.

SUMMARY

Embodiments of the presentation relate to a modular Inertial Measurement Unit (IMU) design and a collection of design methods to produce IMUs that are customized to the needs of end applications. This customizability is enabled by implementing a set of replaceable panels according to embodiments of this presentation, each possibly containing one or more inertial sensors (gyroscopes to sense rotational degrees of freedom (DOFs) or accelerometers to sense linear acceleration DOFs). The panels are connected by specially designed corner brackets to enable arbitrary 3D arrangements of the panels based on the needs of the final application. Other embodiments of this presentation allow multiple layers or shells of panels to be connected as necessary in a 3D arrangement to support the inertial sensors (e.g., with added electronics), to perform thermal and mechanical control of the IMU, and to perform any necessary system level computation and provide interfaces to the outside world.

Embodiments of this presentation comprise a Gyroscope (Gyro) panel/substrate/board having a square form factor. These panels can be constructed using Printed Circuit Board (PCB) techniques.

Embodiments of this presentation comprise an Accelerometer (Accel) panel having the same square form factor as the Gyro panel. These panels can also be constructed using Printed Circuit Board (PCB) techniques.

According to embodiments of this presentation, the Gyro panel and the Accel panel share a common square template form factor.

According to embodiments of this presentation, the square panel template has mounting holes that are rotationally offset (clockwise or counter clockwise) from alignment with the diagonals of the square template.

According to embodiments of this presentation, 3 Gyro panels and 3 Accel panels are arranged to form a 6 degree of freedom (DOF) sensor cluster cube.

According to embodiments of this presentation, the 3 Gyro panels and 3 Accel panels are attached to corner mounting brackets, in this 8 case corner mounting cubes.

According to embodiments of this presentation, the corner mounting cubes share a matching mounting hole offset as on the Gyro and Accel Panels, such that intersection of the mounting screws in the center of the corner mounting cubes is avoided.

According to embodiments of this presentation, all 8 corner mounting cubes are identical, thus minimizing component cost.

According to embodiments of this presentation, the 3 Gyro panels, 3 Accel panels, and 8 corner mounting cubes form an innermost, or layer 1 shell, of a 6 DOF cube IMU. Since the layer 1 shell typically contains the inertial sensors, it can be referred to it as a "sensor cluster".

According to embodiments of this presentation, a commercially available board to board (B2B) connector is used to make an electromechanical connection from the layer 1 shell to the outside world.

According to embodiments of this presentation, the outside world comprises a layer 2 shell B2B connector and a layer 2 shell can be constructed from a similar square panel template (with increased dimensions) and the exact same corner mounting cubes.

According to embodiments of this presentation, to support more electronics and overall IMU signal processing, additional layers (e.g., layer 3, layer 4) can be constructed in an analogous fashion to the layer 2 shell.

According to embodiments of this presentation, the innermost shell layers are each single channel panels (e.g., 1 gyro or accel per panel in a 6 DOF IMU, or a combination panel containing 1 gyro and 1 accel on the same panel in a 12 DOF IMU).

According to embodiments of this presentation, at a higher shell layer the individual channels are combined to perform overall IMU processing tasks (collect multi DOF sensing information, apply any necessary IMU processing, and communicate with the external world).

According to embodiments of this presentation, the corners of each Gyro or Accel panel are chamfered (truncated at a 45-degree angle in the corner), to allow tool access during assembly/disassembly of the IMU as necessary.

Embodiments of this presentation comprise a panel and corner bracket arrangement, with multiple shells and electromechanical signal paths between the shell layers to form an IMU. As the IMU shell arrangement shares a centroid point, some of the calibrations and calculations for using the combined sensor data to generate headings in 3D space are simplified.

Embodiments of this presentation comprise a cube-shaped IMU containing 6 DOFs (3 accelerometers for X, Y, Z directions and 3 gyroscopes for rotation sensing about the X, Y, and Z axes) that is formed by connecting 6 total square panels (3 accelerometer panels, 3 gyroscope panels) using 8 identical specially constructed cube corner brackets. Each of the accelerometer panels shares the same design, and likewise for the gyroscope panels, so any accelerometer panel in the final IMU can be exchanged with any other accelerometer panel, and similarly for the gyroscope panels. This facilitates lower cost construction of the IMU since the individual panels can be constructed and tested to determine if they are in a "known-good" state prior to assembly of the final IMU. The inner cube containing the inertial sensors can be called a "sensor cluster".

According to embodiments of this presentation, the cube's square panel pattern can be replicated (with correspondingly larger squares) in a 2nd layer or shell of panels that envelopes the sensor cluster cube. This would be done, for example, if additional electronics are needed to support the inertial sensors on the sensor cluster, or if additional inertial sensors are desired for redundancy and/or higher performance IMU configurations. This creates the need to pass signals between shell layer 1 of the panels and shell layer 2. This can easily be achieved using standard board to board connectors such as the Samtec LSHM series to pass signals between a panel on layer 1 and a panel on layer 2, although other methods of passing signals can be employed, such as flex circuits. The modular design provided by embodiments of this presentation accommodates this need by placing bracket cubes that the panels attach to in the corners, leaving room in the middle of the panels for the board-to-board connectors, in addition to the inertial sensors and/or any accompanying electronics.

According to embodiments of this presentation, the structure with layer 1 panels connected by board-to-board connectors and corner cube brackets connecting to layer 2, can be extended to connect layer 2 to layer 3, layer 3 to layer 4, and so on and so forth, as needed. Typically, 1 to 3 layers of panels could be used, depending on the needs of the particular IMU design for a particular application.

An embodiment of this presentation includes a corner bracket comprising a volume of matter having n pairs of parallel faces, where n is an integer larger than 2; each face of each pair of parallel faces comprising an opening; the openings in the faces of each pair of parallel faces being joined by a cylindrical recess having a longitudinal axis perpendicular to the faces joined by the cylindrical recess; the longitudinal axis of the cylindrical recesses being arranged such that the cylindrical recesses do not intersect each other.

According to embodiments of this presentation, n=4 and the volume of matter is an octahedron.

According to embodiments of this presentation, n=3 and the volume of matter is a cube.

According to embodiments of this presentation, the cube has three normal axes, X, Y, Z and has a volume comprised of eight cubic sub-volumes of equal size respectively comprising a corner at coordinates 0,0,0; 1,0,0; 0,1,0; 1,1,0; 0,0,1; 1,0,1; 0,1,1; 1,1,1; and wherein a first of the three cylindrical recesses passes through the cubic sub-volumes comprising a corner at coordinates 0,1,1 and 1,1,1 with its longitudinal axis parallel to the X axis; a second of the three cylindrical recesses passes through the cubic sub-volumes comprising a corner at coordinates 1,0,0 and 1,1,0 with its longitudinal axis parallel to the Y axis; and a third of the three cylindrical recesses passes through the cubic sub-volumes comprising a corner at coordinates 0,0,0 and 0,0,1 with its longitudinal axis parallel to the Z axis.

According to embodiments of this presentation, the cube has three normal axes, X, Y, Z and has a volume comprised of eight cubic sub-volumes of equal size respectively comprising a corner at coordinates 0,0,0; 1,0,0; 0,1,0; 1,1,0; 0,0,1; 1,0,1; 0,1,1; 1,1,1; and wherein a first of the three cylindrical recesses passes through the cubic sub-volumes comprising a corner at coordinates 0,1,0 and 1,1,0 with its longitudinal axis parallel to the X axis; a second of the three cylindrical recesses passes through the cubic sub-volumes comprising a corner at coordinates 1,0,1 and 1,1,1 with its longitudinal axis parallel to the Y axis; and a third of the three cylindrical recesses passes through the cubic sub-volumes comprising a corner at coordinates 0,0,0 and 0,0,1 with its longitudinal axis parallel to the Z axis.

According to embodiments of this presentation, the cube has three normal axes, X, Y, Z and has a volume comprised of eight cubic sub-volumes of equal size respectively comprising a corner at coordinates 0,0,0; 1,0,0; 0,1,0; 1,1,0; 0,0,1; 1,0,1; 0,1,1; 1,1,1; and wherein a first of the three cylindrical recesses passes through the cubic sub-volumes comprising a corner at coordinates 0,1,1 and 1,1,1 with its longitudinal axis parallel to the X axis; a second of the three cylindrical recesses passes through the cubic sub-volumes comprising a corner at coordinates 0,0,0 and 0,1,0 with its longitudinal axis parallel to the Y axis; and a third of the three cylindrical recesses passes through the cubic sub-volumes comprising a corner at coordinates 1,0,0 and 1,0,1 with its longitudinal axis parallel to the Z axis.

According to embodiments of this presentation, the cube has three normal axes, X, Y, Z and has a volume comprised of eight cubic sub-volumes of equal size respectively comprising a corner at coordinates 0,0,0; 1,0,0; 0,1,0; 1,1,0; 0,0,1; 1,0,1; 0,1,1; 1,1,1; and wherein a first of the three cylindrical recesses passes through the cubic sub-volumes comprising a corner at coordinates 0,0,1 and 1,0,1 with its longitudinal axis parallel to the X axis; a second of the three cylindrical recesses passes through the cubic sub-volumes comprising a corner at coordinates 1,0,0 and 1,1,0 with its longitudinal axis parallel to the Y axis; and a third of the three cylindrical recesses passes through the cubic sub-volumes comprising a corner at coordinates 0,1,0 and 0,1,1 with its longitudinal axis parallel to the Z axis.

According to embodiments of this presentation, each of the three cylindrical recesses comprises threaded walls capable of receiving a bolt.

According to embodiments of this presentation, the cube is made out of solid metal, for example coper, aluminium or titanium.

Other embodiments of this presentation comprise a substrate provided for being assembled to four identical corner brackets such as described above, the substrate having a generally square shape with edges meeting at a first and a third corners joined by a first diagonal and at a second and a fourth corners joined by a second diagonal wherein: the first corner of the substrate has a first mounting hole, shifted clockwise from the first diagonal such that when aligning two edges of a first of said corner brackets with the two edges of the substrate meeting at said first corner, there exists a unique position of said first corner bracket where the cylindrical recess of said first corner bracket that is normal to the substrate is aligned with said first mounting hole; the second corner of the substrate has a second mounting hole, shifted clockwise with respect to the second diagonal such that when aligning two edges of a second of said corner brackets with the two edges of the substrate meeting at said second corner, there exists a unique position of the second corner bracket, itself rotated along the normal to the substrate 90 degree Clockwise with respect to the first corner bracket, where the cylindrical recess of the second corner bracket that is normal to the substrate is aligned with said second mounting hole; the third corner of the substrate has a third mounting hole, shifted clockwise with respect to the first diagonal such that when aligning two edges of a third of said corner brackets with the two edges of the substrate meeting at said third corner, there exists a unique position of the third corner bracket, itself rotated along the normal to the substrate 90 degree Clockwise with respect to the second corner bracket, where the cylindrical recess of the third corner bracket that is normal to the substrate is aligned with said third mounting hole; the fourth corner of the substrate has a fourth mounting hole, shifted clockwise with respect to the second diagonal such that when aligning two edges of a fourth of said corner brackets with the two edges of the substrate meeting at said fourth corner, there exists a unique position of the fourth corner bracket, itself rotated along the normal to the substrate 90 degree Clockwise with respect to the third corner bracket, where the cylindrical recess of the fourth corner bracket that is normal to the substrate is aligned with said fourth mounting hole.

Another embodiment of this presentation includes an electronic assembly comprising six substrates such as detailed above (hereafter "inner substrates"), wherein said six inner substrates comprise each a sensor circuit mounted parallel to the inner substrate, wherein each corner of each inner substrate has its mounting hole aligned with, and bolted to, a cylindrical recess of one of eight identical corner brackets; wherein each corner bracket comprises a volume of matter having 3 pairs of parallel faces; each face of each pair of parallel faces comprising an opening; the openings in the faces of each pair of parallel faces being joined by a cylindrical recess having a longitudinal axis perpendicular to the faces joined by the cylindrical recess; the longitudinal axis of the cylindrical recesses being arranged such that the cylindrical recesses do not intersect each other.

According to embodiments of this presentation, the six sensor circuits comprise three accelerometer circuits and three gyroscope circuits; wherein the three inner substrates comprising an accelerometer are arranged normal to each other; and wherein the three inner substrates comprising a gyroscope are arranged normal to each other.

According to embodiments of this presentation, the six inner substrates comprise identical square boards, the six inner substrates bolted to the eight brackets forming an inner cube.

According to embodiments of this presentation, the inner cube is filled with a vibration absorption material.

According to embodiments of this presentation, each inner substrate comprises a connector facing outwardly of said inner cube.

Another embodiment of this presentation includes an electronic assembly comprising: an inner cube assembly formed by six smaller square substrates such as detailed above (hereafter "inner substrates"), wherein said six inner substrates comprise each a sensor circuit mounted parallel to the inner substrate, facing inwardly of the inner cube and a connector facing outwardly of said inner cube, wherein each corner of each inner substrate has its mounting hole aligned with, and bolted to, a cylindrical recess of one of eight identical first corner brackets; wherein each first corner bracket comprises a volume of matter having 3 pairs of parallel faces; each face of each pair of parallel faces comprising an opening; the openings in the faces of each pair of parallel faces being joined by a cylindrical recess having a longitudinal axis perpendicular to the faces joined by the cylindrical recess; the longitudinal axis of the cylindrical recesses being arranged such that the cylindrical recesses do not intersect each other; and an outer cube assembly formed by six larger square substrates such as detailed above (hereafter "outer substrates"), wherein said six outer substrates comprise each a connector facing inwardly of said outer cube, arranged such that when the connectors of the inner substrates are connected each to a connector of an outer substrate, the outer substrate form said outer cube; wherein each corner of each outer substrate has its mounting hole aligned with, and bolted to, a cylindrical recess of one of eight second identical corner brackets; wherein each second corner bracket comprises a volume of matter having 3 pairs of parallel faces; each face of each pair of parallel faces comprising an opening; the openings in the faces of each pair of parallel faces being joined by a cylindrical recess having a longitudinal axis perpendicular to the faces joined by the cylindrical recess; the longitudinal axis of the cylindrical recesses being arranged such that the cylindrical recesses do not intersect each other.

According to embodiments of this presentation, the mounting hole of each corner of each outer substrate communicates with a diagonal slit opening on said corner.

According to embodiments of this presentation, at least one corner of one of said inner substrates has one mounting hole aligned with and bolted to a cylindrical recess of one of said eight first identical corner brackets by a bolt that also passes through the outer substrate connected to said inner substrate, and through a tubular standoff that separates said outer substrate from said inner substrate.

According to embodiments of this presentation, each of said six inner substrates comprises a through-recess covered by a first membrane, each accelerometer circuit and each gyroscope circuit being mounted on said first membrane.

According to embodiments of this presentation, each of said six inner substrates comprises a second membrane covering each one of said accelerometer circuits and said gyroscope circuits, as well as a portion of said six inner substrates.

FIGURES

The above features will now be described in more detail in relation with the following figures, wherein.

DETAILED DESCRIPTION

The following description is presented to enable one of ordinary skill in the art to make and use the teachings of this presentation and to incorporate them in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of embodiments of this presentation. However, it will be apparent to one skilled in the art that such embodiments may be practiced without necessarily being limited to these specific details.

All the features disclosed in this presentation, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112, Paragraph 6.

Figure 1:
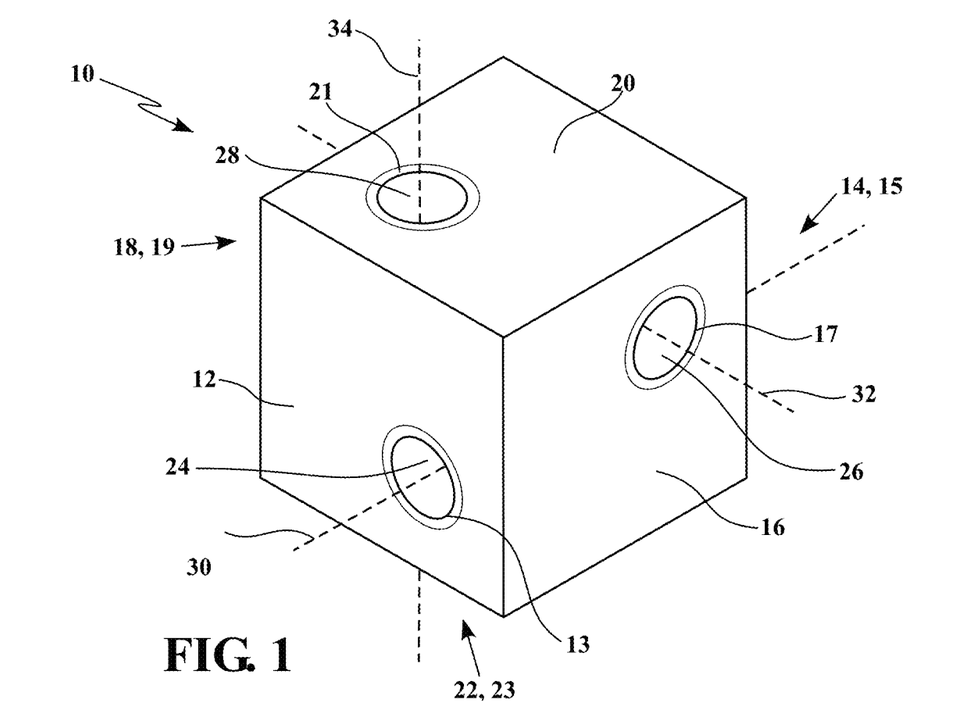
FIG. 1 shows a corner bracket according to embodiments of this presentation.

FIG. 1 is an elevation view of a corner bracket 10 according to embodiments of this presentation, comprising a cube having three pairs of parallel faces, respectively 12 and 14 (not shown in FIG. 1), 16 and 18 (not shown in FIG. 1), 20 and 22 (not shown in FIG. 1). Each face of each pair of parallel faces (respectively 12 and 14, 16 and 18, 20 and 22) comprises an opening (respectively 13 and 15, 17 and 19, 21 and 23); the openings (respectively 13 and 15, 17 and 19, 21 and 23) in the faces of each pair of parallel faces (respectively 12 and 14, 16 and 18, 20 and 22) are joined by a cylindrical recess (respectively 24, 26, 28) having a longitudinal axis (respectively 30, 32, 34) perpendicular to the faces (respectively 12 and 14, 16 and 18, 20 and 22) joined by the cylindrical recess; the longitudinal axis (30, 32, 34) of the cylindrical recesses (24, 26, 28) being arranged such that the cylindrical recesses do not intersect each other. Corner bracket 10 can be made of a monolithic material such as a metal, for example aluminum, and the cylindrical recesses can be drilled into the monolithic material. Preferably, the cylindrical recesses have a circular cross section. The corner bracket 10 can also be made of a polymer, in particular a polymer having a degree of elasticity.

According to an embodiment of this presentation, the inner walls of the cylindrical recesses are threaded for cooperation with threaded bolts. Advantageously, because the three cylindrical recesses do not intersect each other, the three cylindrical recesses of each bracket can each be fully traversed by a bolt at a same time. This for example allows to securely attach three boards or substrates by their corner, normal to each other, using a single corner bracket according to embodiments of this presentation.

According to another embodiment of this presentation, the inner walls of the cylindrical recesses can be smooth. A threaded bolt of smaller diameter and greater length than the cylindrical recesses having at least a threaded end distal from its head can then be slid through each recess until the bolt head contacts one of the corner bracket faces, thus letting the threaded end of the bolt protrude from the opposed face of the corner bracket. The threaded end of the bolt can then be passed through a hole in a corner of a board or substrate and then receive a nut that, once tightened, assembles the bracket to the board. This also allows to securely attach three boards by their corners, normal to each other, using a single corner bracket according to embodiments of this presentation.

Figure 2A:
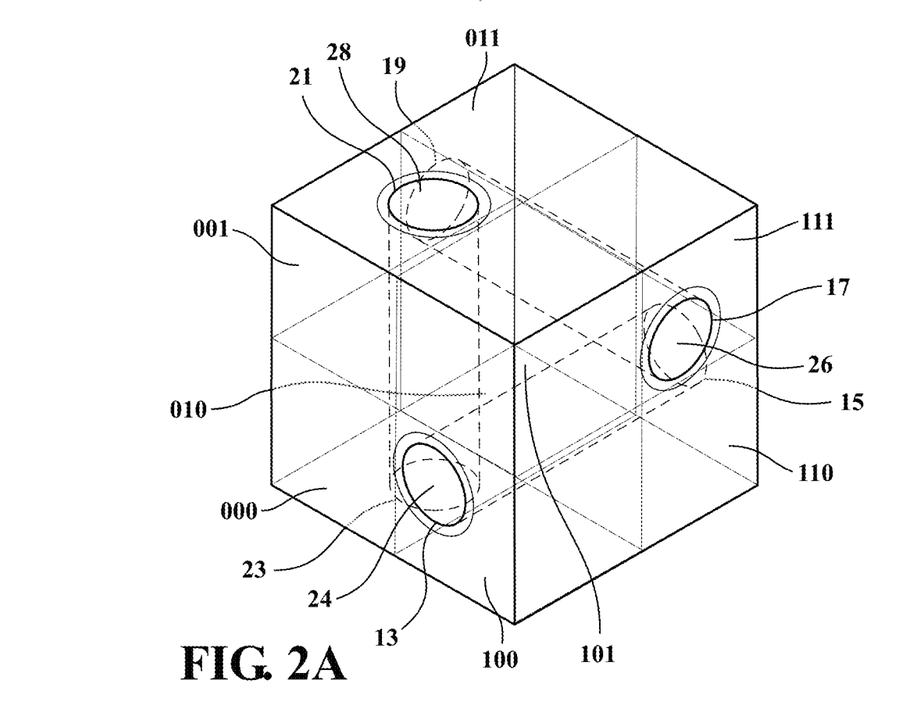
FIG. 2A details the cylindrical recesses of the corner bracket of FIG. 1.

FIG. 2A shows the corner bracket 10 of FIG. 1 as transparent, and therefore shows in more detail the cylindrical recesses 24, 26, 28 as well as the openings 13, 15, 17, 19 and 21, 23 joined by the cylindrical recesses. For ease of reference, each corner of the corner bracket 10 can be given a coordinate in a space defined by the axes of the cube. Assuming that the cube of bracket 10 develops along three directions or normal axes, X, Y, Z, and assuming that a point of origin of coordinates 0,0,0 in the space defined by axes X, Y, Z is located at a lower left front corner of the cube, the lower right front corner of the cube can be located at a point of coordinates 1,0,0; the lower left back corner of the cube can be located at a point of coordinates 0,1,0; and the lower right back corner of the cube can be located at a point of coordinates 1,1,0. Consistently, the upper left front corner of the cube can be located at a point of coordinates 0,0,1; the upper right front corner of the cube can be located at a point of coordinates 1,0,1; the upper left back corner of the cube can be located at a point of coordinates 0,1,1; and the upper right back corner of the cube can be located at a point of coordinates 1,1,1.

Further, the cube 10 can be mentally considered as being comprised of eight cubic sub-volumes of equal dimensions, each cubic sub-volume comprising only one of the eight corners of cube 10, of coordinates 0,0,0; 1,0,0; 0,1,0; 1,1,0; 0,0,1; 1,0,1; 0,1,1; 1,1,1. For clarity, this presentation hereby names respectively each of the cubic sub-volumes as 000, 100, 010, 110, 001, 101, 011 and 111 consistently with the coordinates 0,0,0; 1,0,0; 0,1,0; 1,1,0; 0,0,1; 1,0,1; 0,1,1; 1,1,1 of the corner of cube 10 that it comprises.

With the above naming of the cubic sub-volumes in mind, according to an embodiment of this presentation, cylindrical recess 26 passes through the cubic sub-volumes named 011 and 111 with its longitudinal axis 32 (shown in FIG. 1) parallel to the X axis; cylindrical recess 24 passes through the cubic sub-volumes named 100 and 110 with its longitudinal axis 30 (shown in FIG. 1) parallel to the Y axis; and cylindrical recess 28 passes through the cubic sub-volumes named 000 and 001 with its longitudinal axis 34 (shown in FIG. 1) parallel to the Z axis. Preferably, the cylindrical recesses 24, 26, 28 pass through the above cubic sub-volumes while being as close as possible to the neighboring cubic sub-volumes, without intersecting the neighboring cubic sub-volumes.

Figure 2B:
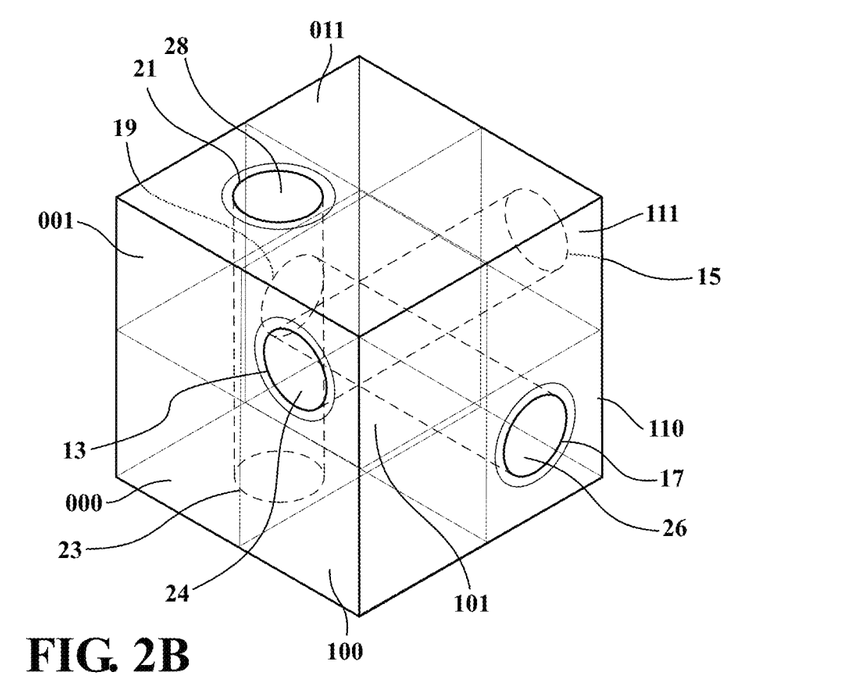
FIGS. 2B, 2C and 2D detail other embodiments of the corner bracket illustrated in FIG. 2A.

FIG. 2B shows a corner bracket 10' according to another embodiment of this presentation, which is identical to corner bracket 10 except that cylindrical recess 26 passes through the cubic sub-volumes named 010 and 110 with its longitudinal axis 32 parallel to the X axis; cylindrical recess 24 passes through the cubic sub-volumes named 101 and 111 with its longitudinal axis 30 parallel to the Y axis; and cylindrical recess 28 passes through the cubic sub-volumes named 000 and 001 with its longitudinal axis 34 parallel to the Z axis.

Figure 2C:
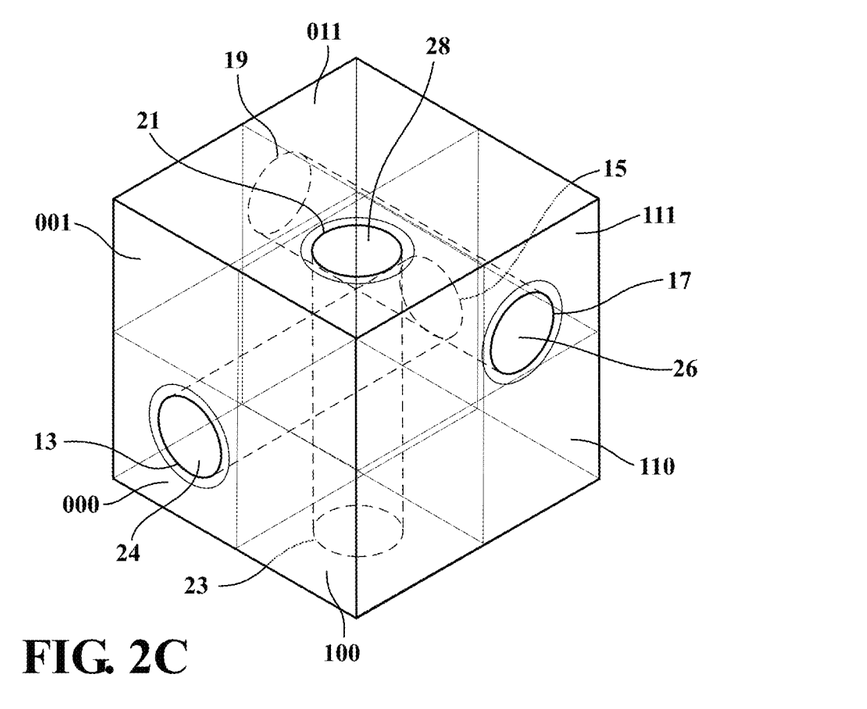

FIG. 2C shows a corner bracket 10" according to another embodiment of this presentation, which is identical to corner bracket 10 except cylindrical recess 26 passes through the cubic sub-volumes named 011 and 111 with its longitudinal axis 32 parallel to the X axis; cylindrical recess 24 passes through the cubic sub-volumes named 000 and 010 with its longitudinal axis 30 parallel to the Y axis; and cylindrical recess 28 passes through the cubic sub-volumes named 100 and 101 with its longitudinal axis 34 parallel to the Z axis.

Figure 2D:
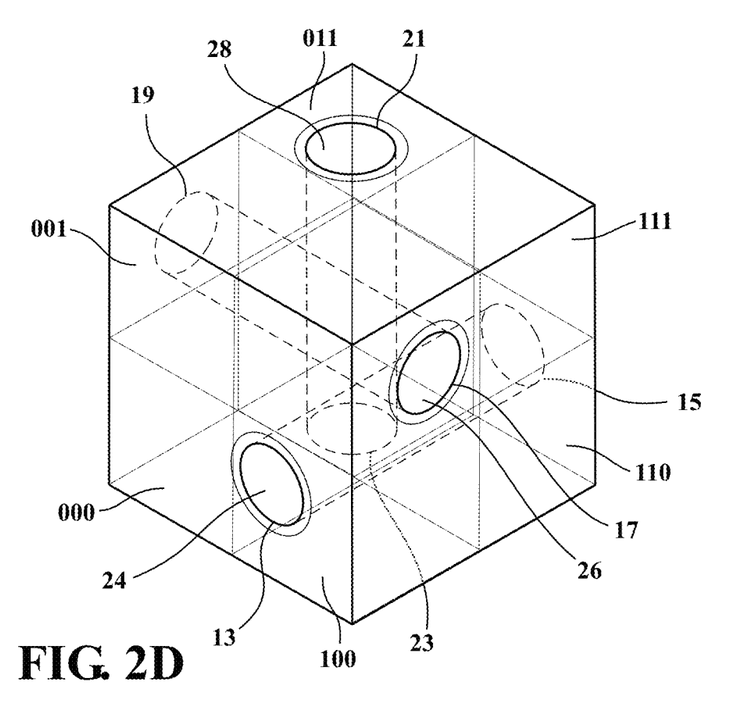

FIG. 2D shows a corner bracket 10''' according to another embodiment of this presentation, which is identical to corner bracket 10 except that cylindrical recess 26 passes through the cubic sub-volumes named 010 and 101 with its longitudinal axis 32 parallel to the X axis; cylindrical recess 24 passes through the cubic sub-volumes named 100 and 110 with its longitudinal axis 30 parallel to the Y axis; and cylindrical recess 28 passes through the cubic sub-volumes named 010 and 011 with its longitudinal axis 34 parallel to the Z axis.

This presentation will hereafter be described in relation with the corner bracket 10 of FIGS. 1 and 2A. Nevertheless, this presentation is expressly directed at any combination of the features described hereafter with the corner brackets 10', 10" and 10''' of FIGS. 2B, 2C and 2D.

Because the cylindrical recesses do not intersect, the corner brackets according to embodiments of this presentation allow a superior assembly quality with respect to, for example, a cube corner brackets having centered mounting bolt holes, where bolts mounted in the holes would interfere at the centroid of the cube, resulting in a potentially weaker design because shorter bolts would have to be used for a same size of cube.

Figure 3:
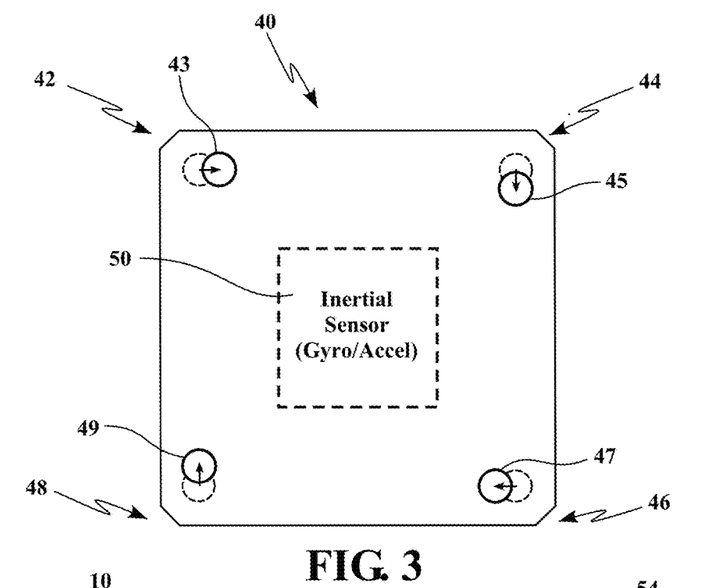
FIG. 3 is a top view of a substrate according to embodiments of this presentation.

FIG. 3 is a top view of a substrate (board) 40 according to embodiments of this presentation. Substrate 40 is a parallelogram, preferably of a general square shape, and it comprises four edges meeting at four corners 42, 44, 46 and 48. Substrate 40 is provided for being assembled to four identical corner brackets 10 such as detailed above. The first corner 42 of the substrate has a mounting hole 43 shifted to the right of the diagonal of substrate 40 that crosses corner 42 (i.e. shifted clockwise of the diagonal), such that when aligning two edges of a first corner bracket 10 with the two edges of the substrate meeting at corner 42, there exists a unique position of the first corner bracket 10 where the cylindrical recess of the first bracket 10 that is normal to substrate 40 is aligned with mounting hole 43. For ease of reference, FIG. 3 shows in dotted line the position that hole 43 would have had if it had been aligned with the diagonal of substrate 40.

Similarly, the second corner 44 of the substrate has a mounting hole 45 shifted clockwise with respect to the diagonal of substrate 40 that crosses corner 44, such that when aligning two edges of a second corner bracket 10 with the two edges of the substrate meeting at corner 44, there exists a unique position of the second corner bracket 10, itself rotated along the normal to the substrate 90 degree Clockwise with respect to the first corner bracket, where the cylindrical recess of the second bracket 10 that is normal to substrate 40 is aligned with mounting hole 45.

Also similarly, the third corner 46 of the substrate has a mounting hole 47 shifted clockwise with respect to the diagonal of substrate 40 that crosses corner 46, such that when aligning two edges of a third corner bracket 10 with the two edges of the substrate meeting at corner 46, there exists a unique position of the third corner bracket 10, itself rotated along the normal to the substrate 90 degree Clockwise with respect to the second corner bracket, where the cylindrical recess of the third bracket 10 that is normal to substrate 40 is aligned with mounting hole 47.

Finally, the fourth corner 48 of the substrate has a mounting hole 49 shifted clockwise with respect to the diagonal of substrate 40 that crosses corner 46, such that when aligning two edges of a fourth corner bracket 10 with the two edges of the substrate meeting at corner 48, there exists a unique position of the fourth corner bracket 10, itself rotated along the normal to the substrate 90 degree Clockwise with respect to the fourth corner bracket, where the cylindrical recess of the fourth bracket 10 that is normal to substrate 40 is aligned with mounting hole 48.

As illustrated in FIG. 3, a first face of substrate 40 can be provided for holding, preferably in a centered manner, a sensor circuit 50, which according to embodiments of this presentation can be an integrated gyroscope circuit or an integrated accelerometer circuit. The inventors have shown that six identical substrates 40 such as described above can be assembled into a cube using eight identical corner brackets as described above. A unique panel design can be used without redesigning the panel to support a particular direction (i.e., any individual gyro or accel panel can be attached to any X, Y, or Z face of the IMU cube, instead of having specific X, Y, and Z gyro or accel panel designs). Advantageously, this allows to separately qualify the individual X, Y, and Z gyro and accel channels on each layer, before ultimately combining them on a higher layer for the entire IMU. This modularity significantly reduces the costs of manufacturing of for example an IMU having six degrees of Freedom (6 DOF) using three integrated gyroscope circuits and three integrated accelerometer circuits attached each to one of six identical substrates 40.

It is to be noted that according to an alternative embodiment of this presentation, the mounting holes 43, 45, 47 and 49 can be offset counterclockwise with respect to the diagonals of substrate 40, instead of clockwise as shown in FIG. 3. The same corner brackets 10 can be used for attachment to a board according to this alternative embodiment, simply rotated 180 degree with respect to the normal to the substrate, compared to the embodiment described in relation with FIG. 3.

Figure 4:
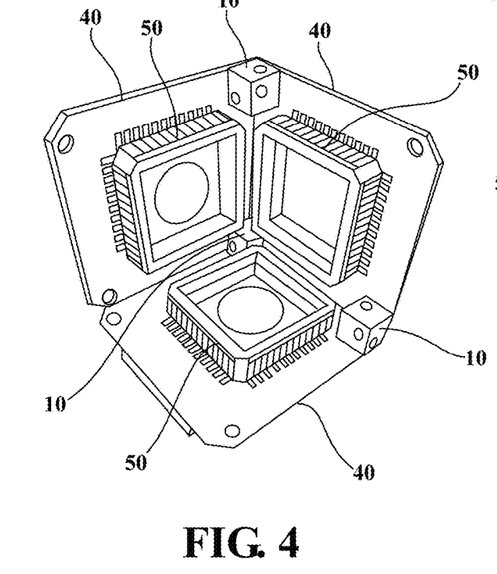
FIG. 4 represents three substrates according to embodiments of this presentation assembled using three corner brackets according to embodiments of this presentation.

FIG. 4 represents three substrates 40 bearing each a sensor circuit 50, such as shown in FIG. 3, assembled together using three corner brackets 10 such as shown in FIG. 1.

Figure 5:
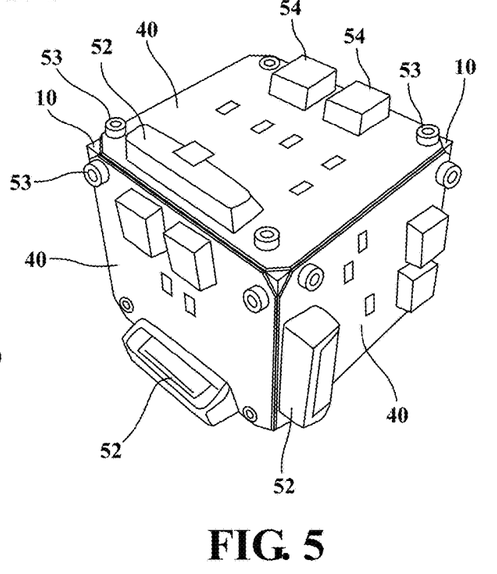
FIG. 5 represents an outer view of six substrates according to embodiments of this presentation assembled using eight corner brackets according to embodiments of this presentation.

FIG. 5 represents an outer view of the arrangement of FIG. 4 with three additional substrates 40 attached to it using five additional corner brackets 10, thus forming a cube-shaped assembly with the sensor circuits facing toward the inside of the cube, and thus not visible in FIG. 5. Each corner of each substrate 40 has its mounting hole aligned with, and bolted to, a cylindrical recess of one of eight identical brackets 10. The heads 53 of the bolts are illustrated. According to embodiments of this presentation, the six sensor circuits comprise three accelerometer circuits and three gyroscope circuits; wherein the three substrates 40 comprising an accelerometer are arranged normal to each other; and wherein the three substrates 40 comprising a gyroscope are arranged normal to each other. According to embodiments of this presentation, the inside of the cube-shaped assembly is filled with a vibration absorption material.

According to embodiments of this presentation, each of the substrates 40 can comprise, on their outside-facing surface, a connector 52, such as a board-to-board connector, for interfacing with the outer environment. Bulky discrete components necessary for the operation of the sensor circuits, such as capacitors 54, can also be arranged on the outside-facing surface of the boards 40.

Figure 6:
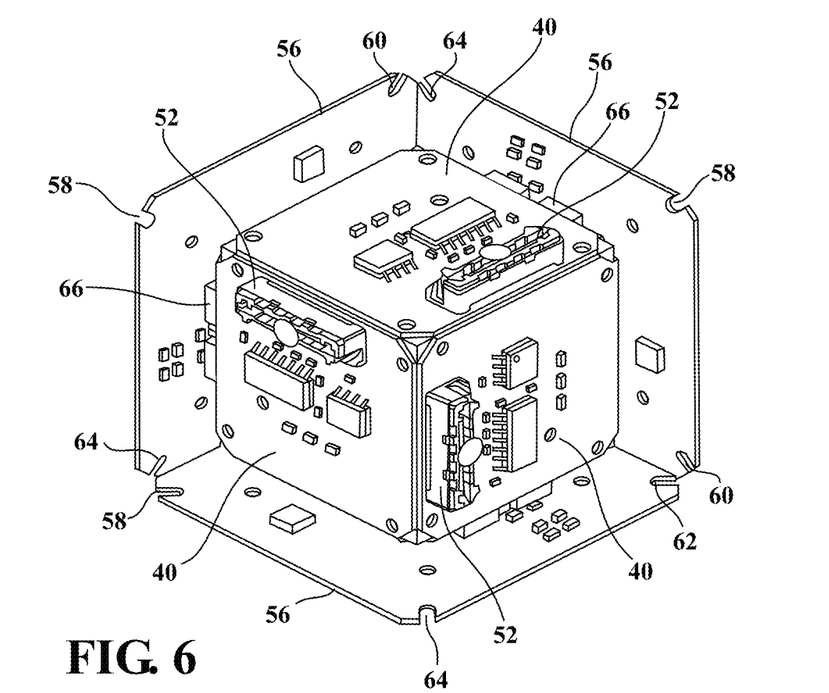
FIG. 6 represents three larger substrates according to embodiments of this presentation, assembled together using one corner bracket according to embodiments of this presentation, the three larger substrates being connected to three of six smaller substrates such as illustrated in FIG. 5.

FIG. 6 represents three larger substrates 56 according to embodiments of this presentation, assembled together using one corner bracket according to embodiments of this presentation, the three larger substrates being connected to three of six smaller substrates such as illustrated in FIG. 5. Each substrate 56 has the same general shape as the substrates 40, but their size is larger. As substrate 40, substrate 56 is of generally square shape, and has four mounting holes 58, 60, 62, 64 that have a position shifted clockwise (or anticlockwise) with respect to the two diagonals of the square shape to allow mounting three substrates 56 by bolting their mounting holes to the cylindrical recesses of a corner bracket 10. Further, the inward-facing surface of substrate 56 can comprise a board-to-board connector 66 arranged such that, when the connector 66 of substrate 56 is connected to the connector 52 of a substrate 40, the substrates 56 and 40 are concentrically aligned and distant by a height equal to half the difference between one side of substrate 56 and the sum of one side of substrate 40 and twice the thickness of substrate 40. As illustrated in FIG. 6, according to an embodiment of this presentation, the mounting hole of each corner of each substrate 56 communicates with a diagonal slit opening on said corner to allow for tolerance during the assembly of the boards together.

Figure 7:
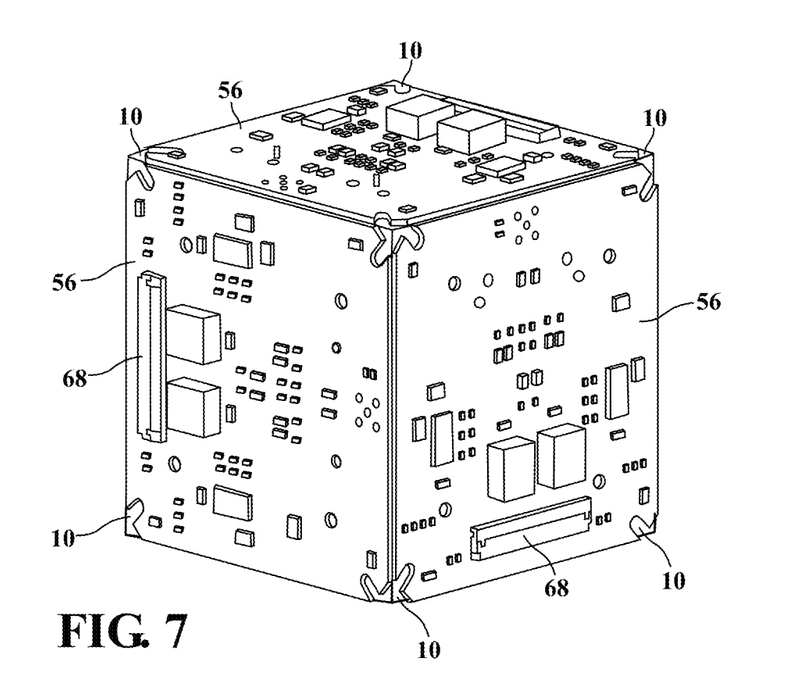
FIG. 7 illustrates three more larger substrates added to the assembly of FIG. 6.
Figure 8:
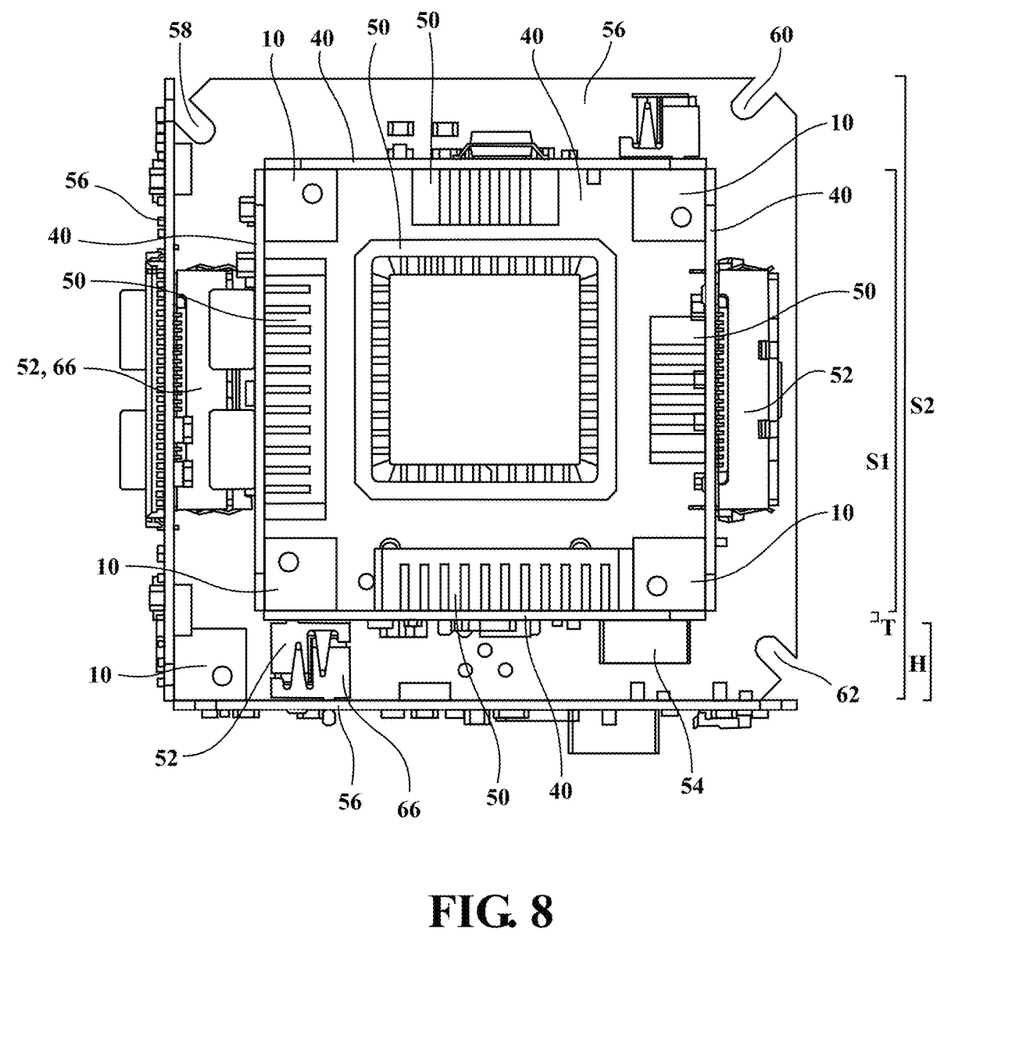
FIG. 8 illustrates a top view of the assembled three larger substrates illustrated in FIG. 6.

FIG. 7 illustrates the assembly of FIG. 6 with three additional larger substrates 56 attached to it by connecting their board-to-board connectors to those of the substrates 40, and by connecting the six substrates 56 together with corner brackets 10. As illustrated in FIG. 7, according to embodiments of this presentation, each substrate 56 comprises a connector 68 facing outwardly of the outer cube formed by the six assembled substrates 56. Connector 68 can be a board-to-board connector, thus allowing to connect the cube formed by the six assembled substrates 56 to a more outward cube comprised of six larger substrates. Connector can also be a flex circuit connector. Advantageously, the six substrates 56 can comprise electronic circuits necessary for the operation of the sensors connected to the boards 40. Such a "nested cubes" construction of a IMU allows locating the sensors, in the central smaller cube, closer to each other. This allows a better accuracy of the IMU for a given set of manufacturing tolerances. Locating the sensors in the inner cube allows avoiding "lever arm" errors that arise due to the arrangement of sensors that occur in traditional larger IMUs because the sensors are further spaced out and/or don't share a common centroid. E.g., this effect due to non-zero d_i distance of the ith accelerometer from the center of the IMU case frame is for example explained in the document: https://ieeexplore.ieee.org/document/9336691, which is hereby incorporated by reference:

FIG. 8 illustrates a top view of the assembly illustrated in FIG. 6 with a top substrate 40 removed to show the inside of the central cube assembly. As outlined in relation with FIG. 6, the connectors 52 and 66 of substrates 40 and 56 are such that, when they are connected together, the substrates 40 and 56 distant by a height H equal to half the difference between one side S2 of substrate 56 and the sum of one side S1 of substrate 40 and twice the thickness T of substrate 40.

Figure 9:
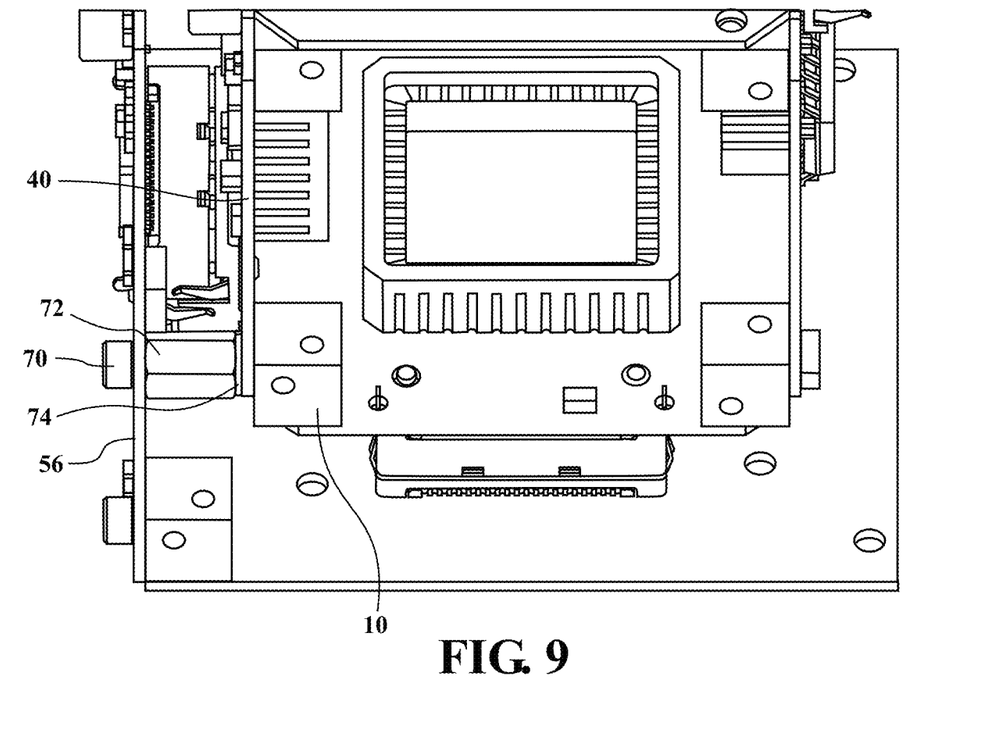
FIG. 9 illustrates an optional assembly detail between larger substrates and smaller substrates using corner brackets according to embodiments of this presentation.

FIG. 9 illustrates an optional assembly detail between a substrate 56 and a substrate 40 using the corner brackets 10, where at least one corner of a substrate 40 connected to a substrate 56 has its mounting hole aligned with and bolted to a cylindrical recess of a corner bracket 10 by a bolt 70 that also passes through the substrate 56 connected to the substrate 40, and through a tubular standoff 72 that separates substrate 56 from said substrate 40 by a height H as described above (one or more Washers rings 74 can be used to fine tune height H).

Figure 10:
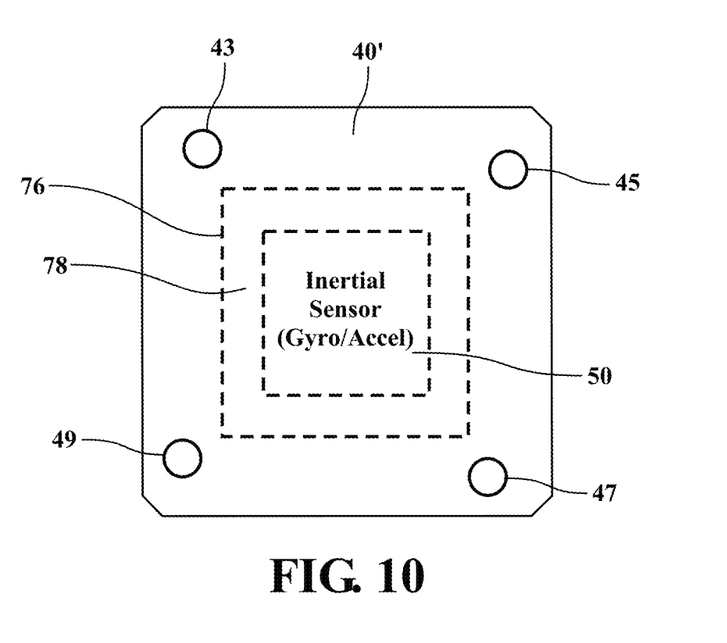
FIG. 10 illustrates an optional arrangement for attaching a sensor circuit to a substrate according to embodiments of this presentation.

FIG. 10 illustrates an optional arrangement for attaching a sensor circuit 50 to a substrate 40' according to embodiments of this presentation. Substrate 40' is essentially identical to substrate 40, except that it comprises a through-recess 76 covered by a membrane 78 itself attached to a portion of substrate 40'; the membrane 78 being itself provided for mounting a sensor circuit 50. Membrane 70 may comprise a socket or layout footprint, for example pads on the flexible membrane that the inertial sensor device can be soldered to (not shown) for receiving sensor circuit 50, as well as electrical connections (not shown) between said socket and the remainder of substrate 40'. Membrane 78 allows for example to thermally and mechanically/vibrationally isolate the sensor circuit 50 from the rest of the IMU by forming a suspension system.

Figure 11:
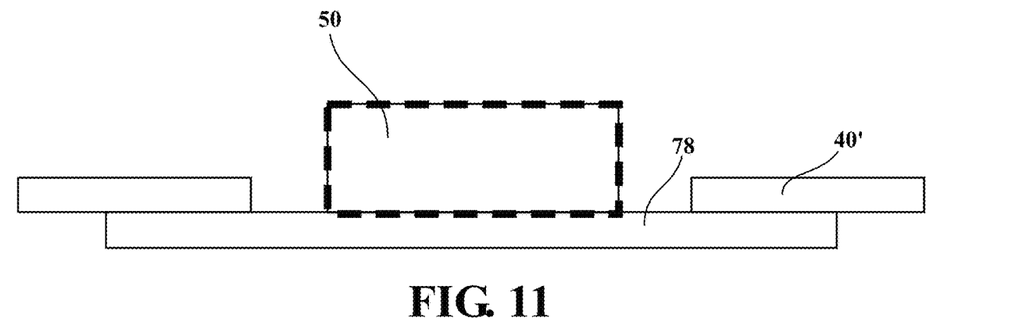
FIG. 11 illustrates a side view of an embodiment of the arrangement of FIG. 10.

FIG. 11 illustrates a side view of an embodiment of the arrangement of FIG. 10.

Figure 12:
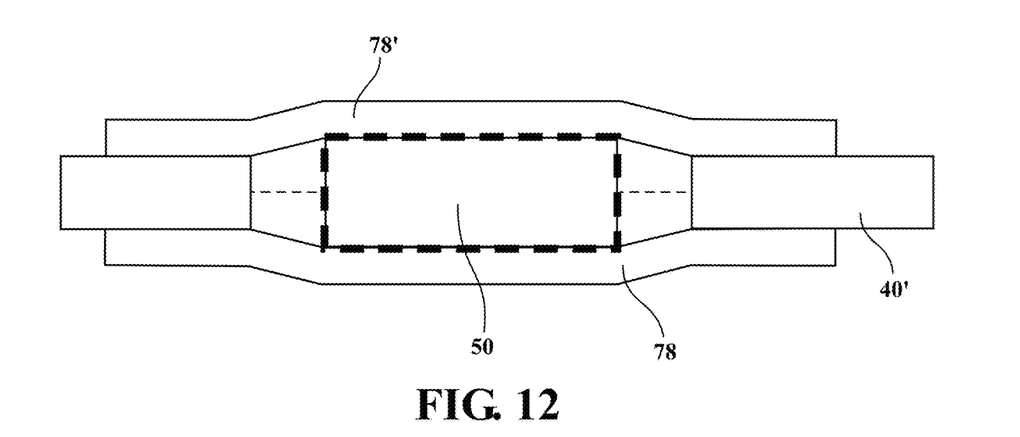
FIG. 12 illustrates a side view of another embodiment of the arrangement of FIG. 10.

FIG. 12 illustrates a side view of another embodiment of the arrangement of FIG. 10, where wherein substrate 40' comprises a second membrane 78' covering sensor circuit 50 as well as a portion of substrate 40'. This embodiment has the advantage of tensioning membrane 78 and 78' by using the sensor circuit 50 itself to stretch both membranes, which may be preferable for vibration and shock isolation of the inertial sensor when built into an IMU, as well as isolating each sensor circuit 50 from acoustic cross talk with the other sensor circuits in the cube. The double membrane approach can be achieved by first attaching the sensor circuit 50 to the first membrane 78, and then bringing second membrane 78' (alone or framed by a panel) into contact with sensor circuit 50. When both membranes 78 and 78' are held in a frame, the frames can be attached together using the mounting bolts or with an adhesive.

Since polyimide is a low thermal conductivity material, either single or double flexible membrane has the further benefit of thermally isolating the sensor circuit 50 from the rest of the IMU, leading to higher performance since inertial sensors are typically sensitive to environmental effects such as thermal swings, shocks, and vibrations. A third advantage of these configurations is that since the membranes are flexible, the sensor circuit 50 will be allowed to expand at its native coefficient of thermal expansion (CTE), reducing the typical CTE-induced packaging stresses that sensor circuits 50 experience when attached directly to a substrate. The sensor circuit 50 package may be ceramic (e.g., ceramic leadless chip carrier/LCC), plastic overmolded, or silicon wafer level vacuum packaged (essentially a bare silicon die). In case the membranes 78, 78' are held in frame panels, the double membrane containing panels should be designed such that the desired tension is achieved, and rounded corners of the sensor circuit 50 package are likely desirable to avoid stress concentrations at the corners of sensor circuit 50, which could otherwise tear the polyimide membranes when placed into tension during assembly.

In summary, this presentation discloses a modular IMU constructed from panels containing inertial sensors including gyroscopes and accelerometers, where the panels are connected in their corners to other panels by corner mounting brackets to form a 3-dimensional arrangement of the inertial sensors.

The panel to corner mounting bracket mounting holes are rotationally offset, clockwise or counter clockwise, from alignment with the corners of the panels.

The corner mounting brackets are specially designed to have corresponding offsets in the mounting screw hole locations to line up with the inertial sensor panels.

Multiple layers of panels can be nested in shells to support necessary functionality (electronics, common IMU processing), using board to board connectors to make electromechanical connections between panels on different shell layers of the IMU.

The nested shell IMU panel arrangement can be a 6 degree of freedom IMU (cube arrangement).

The nested shell IMU panel arrangement can be a 8 DOF IMU (double tetrahedron arrangement).

The nested shell IMU panel arrangement can be a 12 DOF IMU (redundant 6 DOF cube arrangement).

The nested shell IMU panel arrangement can be an N DOF IMU where N is in the range of 1 to 24.

The panels can be constructed from printed circuit board technology. FR4 or similar PCB material can be used for the panels. Alternatively, ceramic PCB material can be used for the panels.

The panels can contain a membrane suspension to which the inertial sensor is attached.

The IMU can be filled with an epoxy or rubber like vibration absorption material.

The central layer corner mounting brackets can be connected internally by supports or solid fill of the same material.

It is to be noted that even though this presentation describes IMU assemblies, other devices than IMU can also be assembled together using the corner brackets and substrates of this presentation, such as 3 axis magnetometers, gravity gradiometers, temperature gradiometers, multiple direction visual or IR camera systems (e.g., for navigation by visual odometry), LIDAR, RADAR, acoustic ranging systems.

The above description has been made in relation with an essentially cubic corner bracket (having three pairs of parallel faces) adapted to assemble six identical square boards into a cubic board assembly. However, other embodiments of this presentation contemplate corner brackets having more than three pairs of parallel faces. Generally, this presentation contemplates a corner bracket comprising a volume of matter having n pairs of parallel faces, where n is an integer larger than 2; each face of each pair of parallel faces comprising an opening; the openings in the faces of each pair of parallel faces being joined by a cylindrical recess having a longitudinal axis perpendicular to the faces joined by the cylindrical recess; the longitudinal axis of the cylindrical recesses being arranged such that the cylindrical recesses do not intersect each other. For example, n can be equal to four and the volume of the bracket can be an octahedron. Such a bracket can be used to assemble together eight identically shaped triangular board into an octahedron-shaped board assembly. Alternatively, the boards can be trapezoid-shaped, their assembly resulting in a truncated octahedron shaped board assembly.

Overall, embodiments of this presentation satisfy the long-felt needs of creating low-cost IMUs by using low-cost methods to create the panels, enable qualification of the IMU components at the individual channel level prior to full IMU assembly (to minimize IMU assembly costs and enhancing IMU yield by using only known-good panels), and enable modular designs that can be swapped in and out as needed to customize the IMU for different applications: e.g., low-cost<6 DOF IMUs vs. high reliability 6 DOF+ IMUs. Further, the unique panel/corner cube/layered shell design method ensures that the design of each individual X, Y, or Z gyro or accel panel doesn't have to be unique, further lowering development and manufacturing costs.

The embodiments described above are generalizable to non 6 DOF IMUs such as 8 DOF IMUs using for example an octahedron board assembly such as outlined above, or 12 DOF IMUs where each panel in a cube sensor cluster arrangement contains both a gyroscope and an accelerometer sensor, for redundancy and improved performance by doubling the number of inertial sensors contained in the IMU. Embodiments of this presentation can also be used to construct fewer than 6 DOF IMUs for situations where navigation through full 3D space is not required, e.g., 2 accel panels and 1 gyro panel for 2D constrained vehicle applications, leaving 3 dummy panels in the sensor cluster.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112(f), sixth paragraph, unless the element is expressly recited using the phrase "means for . . . " and no method or process step herein is to be construed under those provisions unless the step, or steps, are expressly recited using the phrase "comprising the step (s) of . . . ."

All elements, parts and steps described herein are preferably included. It is to be understood that any of these elements, parts and steps may be replaced by other elements, parts and steps or deleted altogether as will be obvious to those skilled in the art.

What is claimed is:

1. A substrate provided for being assembled to four identical corner brackets, each corner bracket comprising a volume of matter having 3 pairs of parallel faces; each face of each pair of parallel faces comprising an opening; the openings in the faces of each pair of parallel faces being joined by a cylindrical recess having a longitudinal axis perpendicular to the faces joined by the cylindrical recess; the longitudinal axis of the cylindrical recesses being arranged such that the cylindrical recesses do not intersect each other;

the substrate having a generally square shape with edges meeting at a first and a third corners joined by a first diagonal and at a second and a fourth corners joined by a second diagonal wherein:

the first corner of the substrate has a first mounting hole, shifted clockwise from the first diagonal such that when aligning two edges of a first corner bracket of said four identical corner brackets with the two edges of the substrate meeting at said first corner, there exists a unique position of said first corner bracket where the cylindrical recess of said first corner bracket that is normal to the substrate is aligned with said first mounting hole;

the second corner of the substrate has a second mounting hole, shifted clockwise with respect to the second diagonal such that when aligning two edges of a second corner bracket of said four identical corner brackets with the two edges of the substrate meeting at said second corner, there exists a unique position of the second corner bracket, itself rotated along the normal to the substrate 90 degree clockwise with respect to the first corner bracket, where the cylindrical recess of the second corner bracket that is normal to the substrate is aligned with said second mounting hole;

the third corner of the substrate has a third mounting hole, shifted clockwise with respect to the first diagonal such that when aligning two edges of a third corner bracket of said four identical corner brackets with the two edges of the substrate meeting at said third corner, there exists a unique position of the third corner bracket, itself rotated along the normal to the substrate 90 degree clockwise with respect to the second corner bracket, where the cylindrical recess of the third corner bracket that is normal to the substrate is aligned with said third mounting hole;

the fourth corner of the substrate has a fourth mounting hole, shifted clockwise with respect to the second diagonal such that when aligning two edges of a fourth corner bracket of said four identical corner brackets with the two edges of the substrate meeting at said fourth corner, there exists a unique position of the fourth corner bracket, itself rotated along the normal to the substrate 90 degree clockwise with respect to the third corner bracket, where the cylindrical recess of the fourth corner bracket that is normal to the substrate is aligned with said fourth mounting hole.

2. An electronic assembly comprising six inner substrates according to claim 1, wherein said six inner substrates comprise each a sensor circuit mounted parallel to the inner substrate, wherein each corner of each inner substrate has its mounting hole aligned with, and bolted to, a cylindrical recess of one of eight identical corner brackets; wherein each corner bracket comprises a volume of matter having 3 pairs of parallel faces; each face of each pair of parallel faces comprising an opening; the openings in the faces of each pair of parallel faces being joined by a cylindrical recess having a longitudinal axis perpendicular to the faces joined by the cylindrical recess; the longitudinal axis of the cylindrical recesses being arranged such that the cylindrical recesses do not intersect each other.

3. The assembly of claim 2, wherein at least one of the corner brackets is a cube that has three normal axes, X, Y, Z and has a volume comprised of eight cubic sub-volumes of equal size respectively comprising a corner at coordinates 0,0,0; 1,0,0; 0,1,0; 1,1,0; 0,0,1; 1,0,1; 0,1,1; 1,1,1; and wherein a first of the three cylindrical recesses passes through the cubic sub-volumes comprising a corner at coordinates 0,1,1 and 1,1,1 with its longitudinal axis parallel to the X axis; a second of the three cylindrical recesses passes through the cubic sub-volumes comprising a corner at coordinates 1,0,0 and 1,1,0 with its longitudinal axis parallel to the Y axis; and a third of the three cylindrical recesses passes through the cubic sub-volumes comprising a corner at coordinates 0,0,0 and 0,0,1 with its longitudinal axis parallel to the Z axis.

4. The assembly of claim 2, wherein at least one of the corner brackets is a cube that has three normal axes, X, Y, Z and has a volume comprised of eight cubic sub-volumes of equal size respectively comprising a corner at coordinates 0,0,0; 1,0,0; 0,1,0; 1,1,0; 0,0,1; 1,0,1; 0,1,1; 1,1,1; and wherein a first of the three cylindrical recesses passes through the cubic sub-volumes comprising a corner at coordinates 0,1,0 and 1,1,0 with its longitudinal axis parallel to the X axis; a second of the three cylindrical recesses passes through the cubic sub-volumes comprising a corner at coordinates 1,0,1 and 1,1,1 with its longitudinal axis parallel to the Y axis; and a third of the three cylindrical recesses passes through the cubic sub-volumes comprising a corner at coordinates 0,0,0 and 0,0,1 with its longitudinal axis parallel to the Z axis.

5. The assembly of claim 2, wherein at least one of the corner brackets is a cube that has three normal axes, X, Y, Z and has a volume comprised of eight cubic sub-volumes of equal size respectively comprising a corner at coordinates 0,0,0; 1,0,0; 0,1,0; 1,1,0; 0,0,1; 1,0,1; 0,1,1; 1,1,1; and wherein a first of the three cylindrical recesses passes through the cubic sub-volumes comprising a corner at coordinates 0,1,1 and 1,1,1 with its longitudinal axis parallel to the X axis; a second of the three cylindrical recesses passes through the cubic sub-volumes comprising a corner at coordinates 0,0,0 and 0,1,0 with its longitudinal axis parallel to the Y axis; and a third of the three cylindrical recesses passes through the cubic sub-volumes comprising a corner at coordinates 1,0,0 and 1,0,1 with its longitudinal axis parallel to the Z axis.

6. The assembly of claim 2, wherein at least one of the corner brackets is a cube that has three normal axes, X, Y, Z and has a volume comprised of eight cubic sub-volumes of equal size respectively comprising a corner at coordinates 0,0,0; 1,0,0; 0,1,0; 1,1,0; 0,0,1; 1,0,1; 0,1,1; 1,1,1; and wherein a first of the three cylindrical recesses passes through the cubic sub-volumes comprising a corner at coordinates 0,0,1 and 1,0,1 with its longitudinal axis parallel to the X axis; a second of the three cylindrical recesses passes through the cubic sub-volumes comprising a corner at coordinates 1,0,0 and 1,1,0 with its longitudinal axis parallel to the Y axis; and a third of the three cylindrical recesses passes through the cubic sub-volumes comprising a corner at coordinates 0,1,0 and 0,1,1 with its longitudinal axis parallel to the Z axis.

7. The assembly of claim 2, wherein each of the three cylindrical recesses of at least one of the corner brackets comprises threaded walls capable of receiving a bolt.

8. The assembly of claim 2, wherein at least one of the corner brackets is a cube of solid metal.

9. The electronic assembly of claim 2, wherein the six sensor circuits comprise three accelerometer circuits and three gyroscope circuits; wherein the three inner substrates comprising an accelerometer are arranged normal to each other; and wherein the three inner substrates comprising a gyroscope are arranged normal to each other.

10. The electronic assembly of claim 9, wherein each of said six inner substrates comprises a through-recess covered by a first membrane, each accelerometer circuit and each gyroscope circuit being mounted on said first membrane.

11. The electronic assembly of claim 10, wherein each of said six inner substrates comprises a second membrane covering each one of said accelerometer circuits and said gyroscope circuits, as well as a portion of said six inner substrates.

12. The electronic assembly of claim 2, wherein the six inner substrates comprise identical square boards, the six inner substrates bolted to the eight brackets forming an inner cube.

13. The electronic assembly of claim 12, wherein the inner cube is filled with a vibration absorption material.

14. The electronic assembly of claim 12 herein each inner substrate comprises a connector facing outwardly of said inner cube.

15. An electronic assembly comprising:
an inner cube assembly formed by six smaller square inner substrates according to claim 1, wherein said six inner substrates comprise each a sensor circuit mounted parallel to the inner substrate, facing inwardly of the inner cube and a connector facing outwardly of said inner cube, wherein each corner of each inner substrate has its mounting hole aligned with, and bolted to, a cylindrical recess of one of eight identical first corner brackets; wherein
each first corner bracket comprises a volume of matter having 3 pairs of parallel faces; each face of each pair of parallel faces comprising an opening; the openings in the faces of each pair of parallel faces being joined by a cylindrical recess having a longitudinal axis perpendicular to the faces joined by the cylindrical recess; the longitudinal axis of the cylindrical recesses being arranged such that the cylindrical recesses do not intersect each other; and
an outer cube assembly formed by six larger square outer substrates according to claim 1, wherein said six outer substrates comprise each a connector facing inwardly of said outer cube, arranged such that when the connectors of the inner substrates are connected each to a connector of an outer substrate, the outer substrate form said outer cube; wherein each corner of each outer substrate has its mounting hole aligned with, and bolted to, a cylindrical recess of one of eight second identical corner brackets; wherein
each second corner bracket comprises a volume of matter having 3 pairs of parallel faces; each face of each pair of parallel faces comprising an opening; the openings in the faces of each pair of parallel faces being joined by a cylindrical recess having a longitudinal axis perpendicular to the faces joined by the cylindrical recess; the longitudinal axis of the cylindrical recesses being arranged such that the cylindrical recesses do not intersect each other.

16. The electronic assembly of claim 15, wherein the mounting hole of each corner of each outer substrate communicates with a diagonal slit opening on said corner.

17. The electronic assembly of claim 15, wherein at least one corner of one of said inner substrates has one mounting hole aligned with and bolted to a cylindrical recess of one of said eight first identical corner brackets by a bolt that also passes through the outer substrate connected to said inner substrate, and through a tubular standoff that separates said outer substrate from said inner substrate.

* * * * *